(12) United States Patent
Hefti

(10) Patent No.: US 6,206,561 B1
(45) Date of Patent: Mar. 27, 2001

(54) COLLAPSIBLE WHISK

(75) Inventor: Rolf Hefti, Cugnasco (CH)

(73) Assignee: Kuhn Rikon Corporation, Greenbrea, CA (US)

( * ) Notice: Subject to any disclaimer, the term of this patent is extended or adjusted under 35 U.S.C. 154(b) by 0 days.

(21) Appl. No.: 09/264,390

(22) Filed: Mar. 8, 1999

(51) Int. Cl.$^7$ ..................................... B01F 13/00
(52) U.S. Cl. ............................ 366/129; 366/343
(58) Field of Search .................. 366/129, 342, 366/343, 285; D7/690; 416/70 R, 72, 213 A, 230, 227 R; 99/348

(56) References Cited

U.S. PATENT DOCUMENTS

| | | | |
|---|---|---|---|
| 401,058 | * | 4/1889 | Pfau ..................................... 366/129 |
| 565,260 | * | 8/1896 | Cook ..................................... 366/129 |
| 1,579,323 | * | 4/1926 | Johnston . |
| 1,722,104 | * | 7/1929 | Miner . |
| 2,499,074 | * | 2/1950 | Nordgarden ......................... 366/129 |
| 3,412,983 | * | 11/1968 | Kesilman et al. . |

FOREIGN PATENT DOCUMENTS

8713911 * 10/1987 (DE) .

* cited by examiner

*Primary Examiner*—Tony G. Soohoo
(74) *Attorney, Agent, or Firm*—Limbach & Limbach LLP

(57) ABSTRACT

A collapsible wire whisk including a handle and wire basket. The wire basket comprises a plurality of wires that are coupled to a wire holder slidably and twistably mounted within the handle. The handle is hollow and has a proximal end with two arcuate apertures through which the wires may be inserted. The wire holder is a hollow cylinder that has a plurality of holes circumferentially positioned on each end. Each end of each wire of the wire basket is threaded through one of the holes on each end of the wire holder. The wires are crimped both above and below the wire holder to keep the wire basket coupled to the wire holder, but the wires remain free to be twisted.

29 Claims, 4 Drawing Sheets

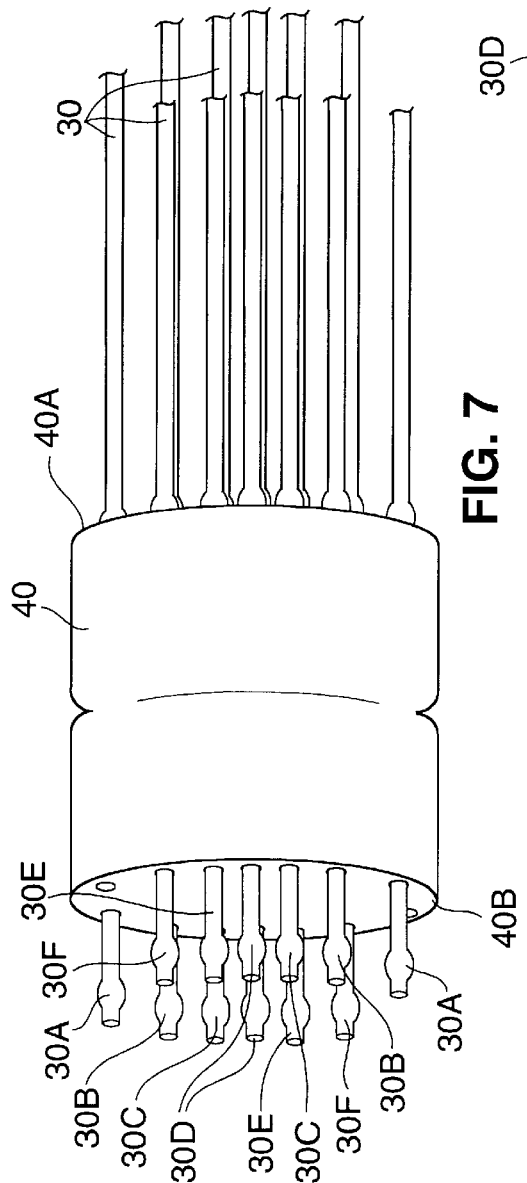
FIG. 7
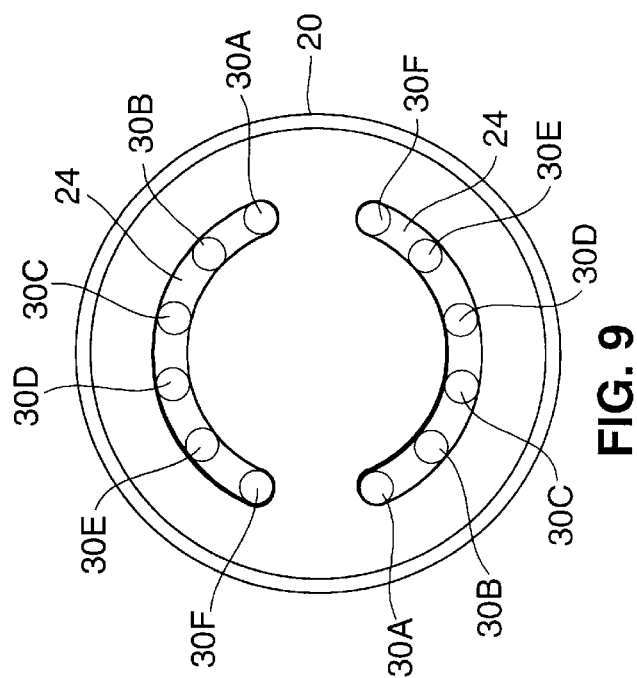
FIG. 9
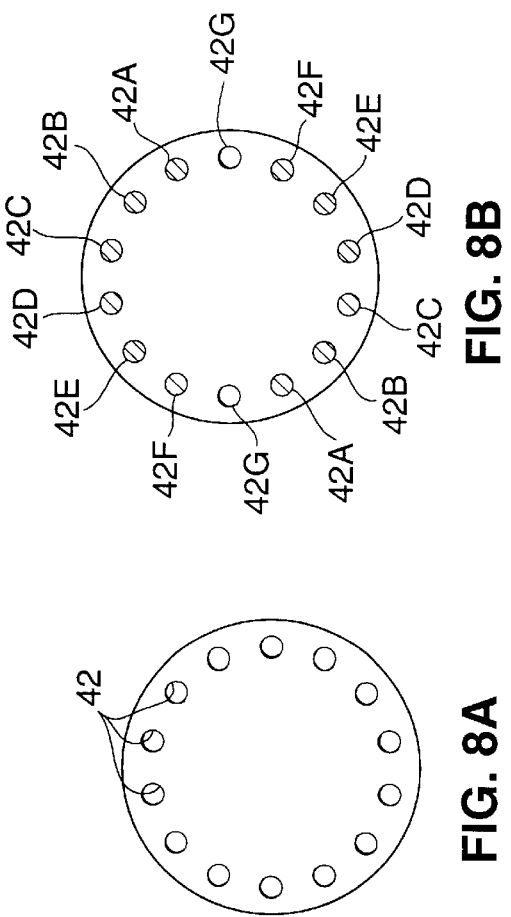
FIG. 8B
FIG. 8A

COLLAPSIBLE WHISK

RELATED APPLICATIONS

This application claims the benefit of U.S. Provisional Application entitled: FOLDABLE WHISK, Filed Jan. 8, 1999, application Ser. No. 60/115,043.

FIELD OF THE INVENTION

The invention relates to kitchen utensils for mixing or beating food by hand and, in particular, to a collapsible wire whisk. The collapsible wire whisk provides a mixing or beating tool that may be collapsed and flattened for easy storage.

DESCRIPTION OF RELATED ART

Whisks are wire kitchen utensils generally used for mixing or beating food by hand. The wires of a whisk are sized and shaped such that the wires are nested together. The wires of whisks are fairly rigid and designed especially for aerating food substances. Whisks are available in a variety of shapes and sizes. The particular tasks for which a whisk is suitable depend on the shape of the wires. There are generally three shapes available for whisks: straight, balloon, and flat.

For example, a straight whisk is used for making smooth sauces and is also suitable for mixing and folding. A balloon whisk is designed for aerating food substances, such as egg whites, creams, and light batters. The large balloon-shaped head of a balloon whisk is designed for beating the maximum amount of air into light mixtures. A flat whisk is generally used for stirring or aleglazing a pan.

Whisks are sold in a variety of sizes since whisks of different sizes are needed, depending on the amount of food to be mixed and on the size of the mixing bowl. Larger whisks, such as the 12-inch whisks (measured from the tip of the handle to the top of the wires), are usually the most useful. However, a large balloon or straight whisk can be difficult to store in most kitchen drawers because the wires are rigid and occupy a fairly large amount of space. There is also the possibility of damaging the whisk if the wires are bent out of shape when stored in a drawer or some other tight space. Therefore, there is a need for a whisk that is large enough to be useful, but at the same time, capable of occupying a minimal amount of space when it is stored.

SUMMARY OF THE INVENTION

The present invention is a collapsible wire whisk that includes a hollow handle and wire basket. The wire basket comprises a plurality of wires that are coupled to a wire holder slidably and twistably mounted within the handle. The handle has a proximal end with two arcuate apertures through which the wires are inserted. The wire holder is a hollow cylinder having a plurality of holes circumferentially positioned on each end.

The wires are bent and positioned to form a basket such that the wires are nested together The two ends of each wire are threaded through the wire holder. The wires are crimped both above and below the wire holder to hold keep the wires coupled to the wire holder. Although the wires are kept in place longitudinally with respect to the wire holder, the wires remain free to twist.

The wire basket of the whisk may be moved between a collapsed position and an expanded position by twisting the wires and/or the wire holder. The collapsible whisk of the present invention provides a full sized whisk that may be easily collapsed and stored in flattened state. The present invention can therefore be stored in even small kitchen drawers. Since the wires of the whisk lay flat in a collapsed position, the collapsed whisk may also be used as a flat whisk for stirring or aleglazing a pan. The present invention therefore provides a balloon whisk that may be easily converted into flat whisk.

BRIEF DESCRIPTION OF THE DRAWINGS

The present invention will be better understood by reference to the attached figures in which:

FIG. 7 is a perspective view of the wires threaded through the holes in the wire holder;

FIG. 8A is an end view of the wire holder;

FIG. 8B is an end view of the wire holder showing a cross-sectional view of the wires threaded through the wire holder; and FIG. 9 is a an end view of the proximal end of the handle.

DETAILED DESCRIPTION OF THE INVENTION

Figures 1, 2A, 2B:
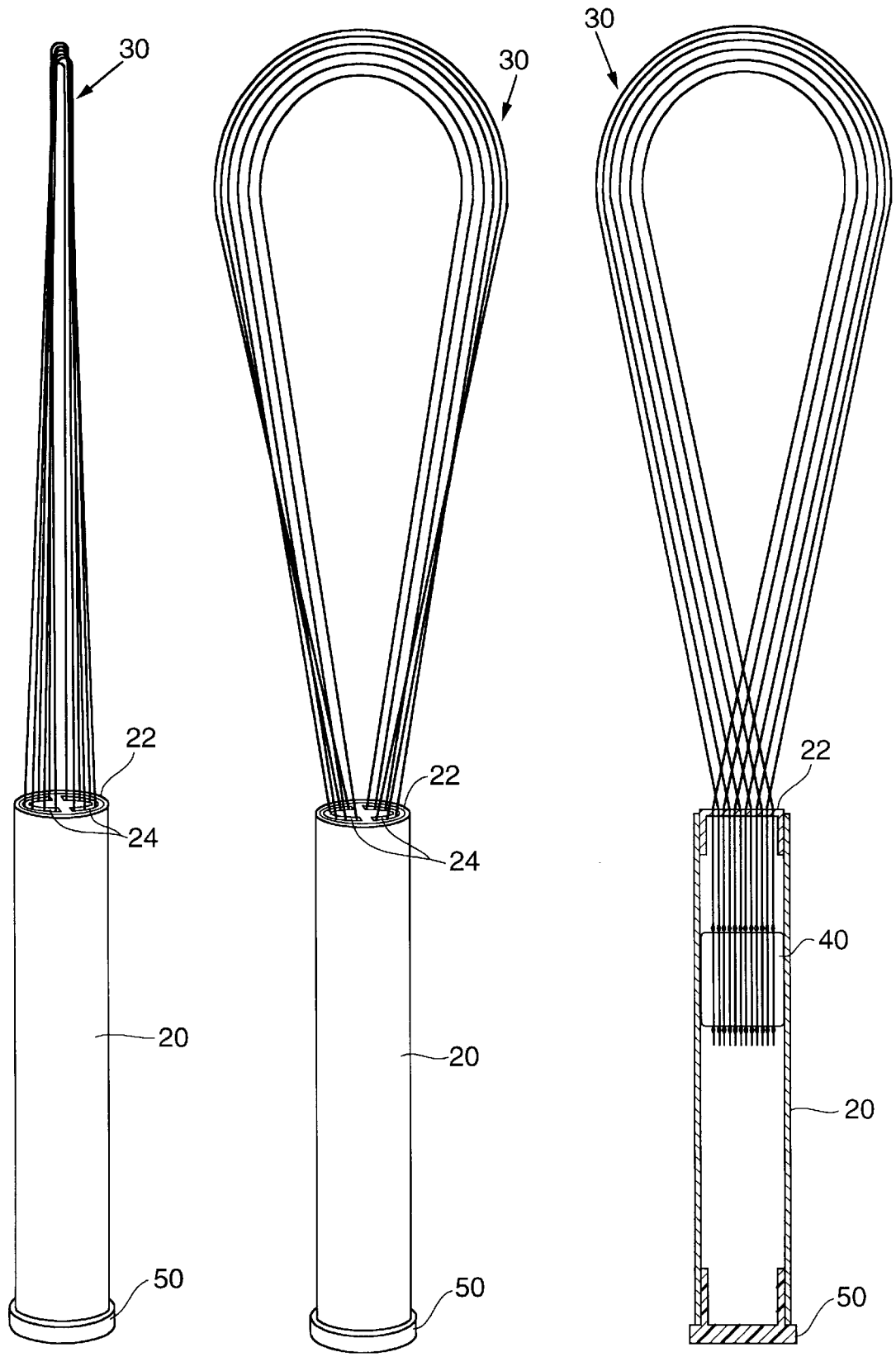
FIG. 1 is a perspective view of the side of an embodiment of the whisk in accordance with the present invention in a collapsed state.
FIG. 2A is a perspective view of the front of the FIG. 1 whisk in a collapsed state.
FIG. 2B is a cross-sectional view of the handle of the FIG. 1 whisk.
Figure 3:
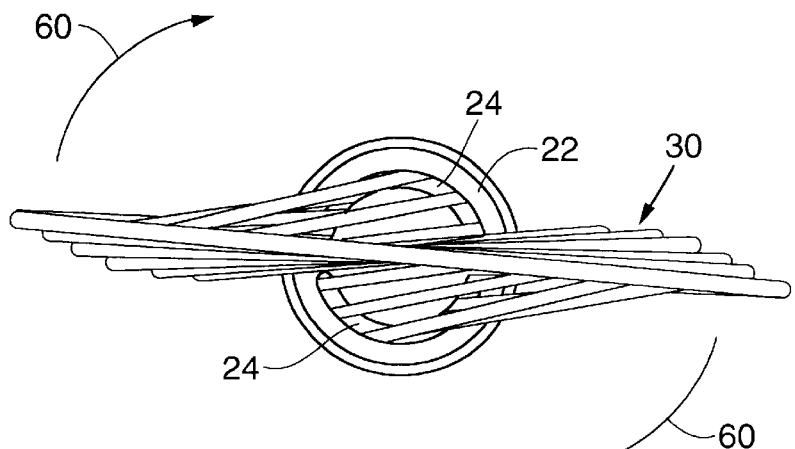
FIG. 3 is an elevational end view of the top of the FIG. 1 whisk in a collapsed state.

The present invention is a collapsible wire whisk that may be easily stored in a flattened state. One embodiment of the collapsible whisk of the present invention will be described with reference to FIGS. 1–9. FIGS. 1 and 2A are perspective views of the whisk of the present invention in a flattened or collapsed state. FIG. 2B is a cross-sectional view of the handle 20 of the whisk with the wire basket 30 in a collapsed state. FIG. 3 is a perspective view of the whisk of the present invention in an expanded state.

Figure 4:
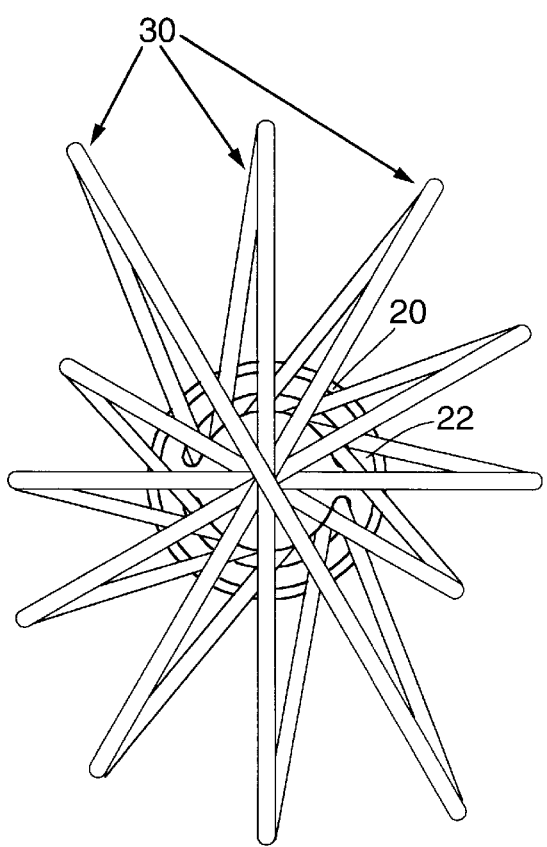
FIG. 4 is an elevational end view of the top of the FIG. 1 whisk in an expanded state.
Figures 5, 6:
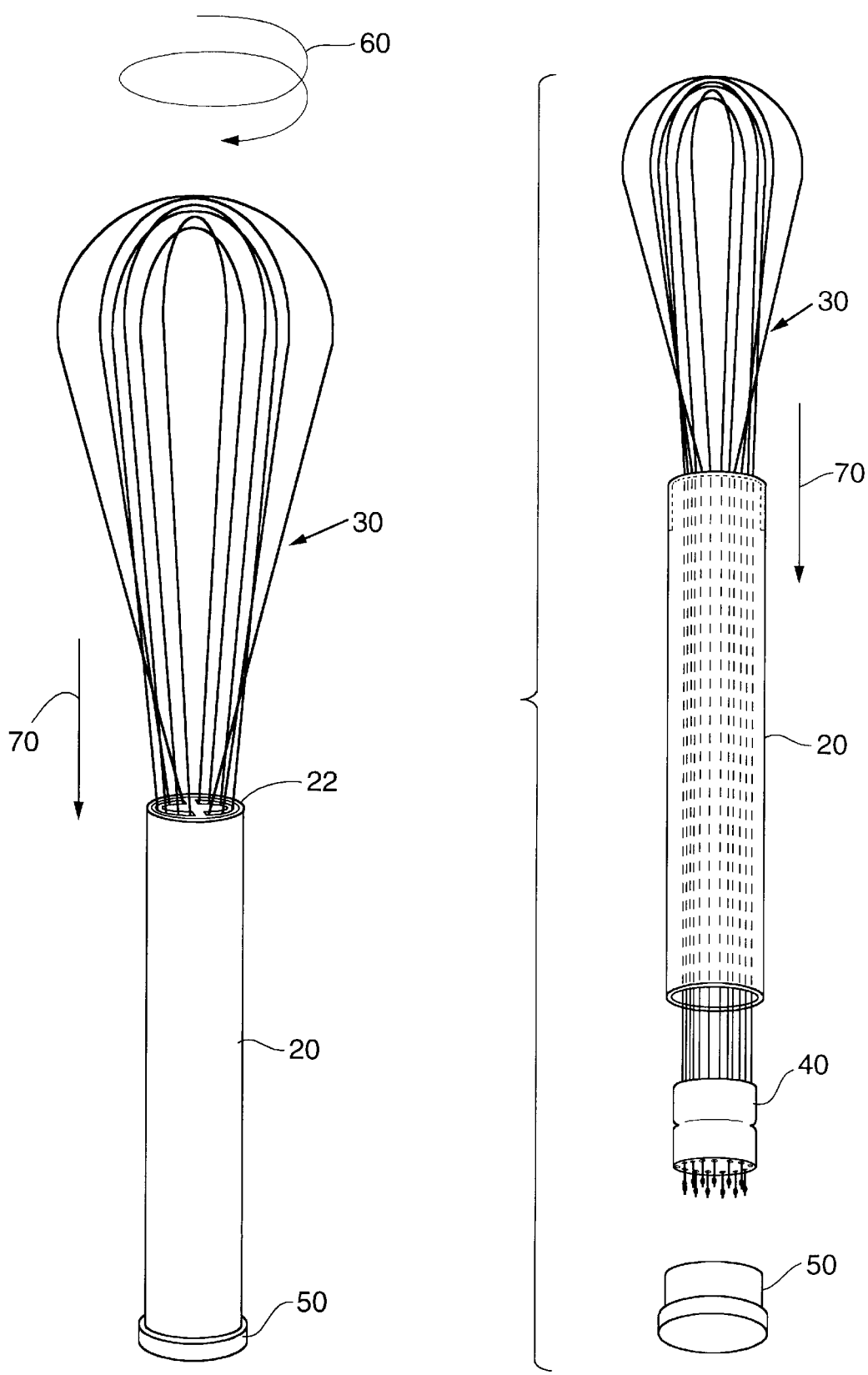
FIG. 5 is a perspective view of the front of the FIG. 1 whisk in an expanded state.
FIG. 6 is a partially exploded perspective view of the FIG. 1 whisk in an expanded state.

With reference to FIGS. 1–6, the collapsible whisk of the present invention includes a handle 20 and a wire basket 30. The wire basket comprises a plurality of wires 30A, 30B, 30C, 30D, 30E, 30F that are attached to a wire holder 40. As shown in FIGS. 2B and 6, the wire holder 40 is slidably and twistably mounted within the handle 20.

The handle 20 is a hollow cylinder with two open ends. The handle 20 preferably is formed of stainless steel. Alternatively, the handle 20 may be formed of other materials, including, for example, wood.

The distal end of the handle 20 may be covered with a cap 50, as shown in FIG. 6. In one embodiment, the cap 50 is formed of a plastic material for insertion into the handle 20. The cap 50 may be removed for cleaning the interior of the handle 20 if food substances enter into the handle 20 during mixing.

FIG. 9 is an end view of the proximal end 22 of the handle 20. FIG. 9 also shows the specific placement of the wires 30A, 30B, 30C, 30D, 30E, 30F in one embodiment. The proximal end 22 of the handle is formed with two arcuate apertures 24, as shown in FIG. 9. The wires 30 of the whisk may be inserted into the handle 20 through the two arcuate apertures 24, as shown in FIGS. 1, 2A, 2B, 5, and 6. The arcuate apertures 24 function to guide the wires 30A, 30B, 30C, 30D, 30E, 30F when they are twisted, which will be described in more detail below. In an alternative embodiment, the two arcuate apertures 24 may be continuous such that it is a single continuous annular aperture instead.

To facilitate the manufacturing process for the whisk, the proximal end 22 may be formed of a separate piece from the handle 20, as shown in FIGS. 2B and 6. The proximal end 22 may be attached to the handle 20 in a variety of ways, including but not limited to welding and attachment utilizing a water resistant adhesive. Alternatively, the proximal end 22 and the handle 20 may be formed of a single continuous piece of material, such as stainless steel.

The wire holder 40 is a hollow cylinder, as shown in FIGS. 2B, 6, and 7. The two ends 40A, 40B of the wire holder 40 are generally covered, but formed with a plurality of holes 42 through which the wires 30 may be threaded. In one embodiment, there are fourteen holes 42 positioned in a circular fashion along the edge of the two ends 40A, 40B of the wire holder 40, as shown in FIGS. 8A and 8B.

The wires 30A, 30B, 30C, 30D, 30E, 30F of the whisk are thin wires that are initially straight. Each wire of the wire basket 30 has two ends. The wires 30A, 30B, 30C, 30D, 30E, 30F are bent and curved to the desired shape and each end of a wire 30A, 30B, 30C, 30D, 30E, 30F is threaded through a hole 42 of the wire holder 40. Each wire 30A, 30B, 30C, 30D, 30E, 30F may be bent and curved into a substantially "tear drop" shape with a broad rounded end and a narrow base, as shown in FIGS. 2A and 2B.

The wires of the wire basket 30 may also be formed of stainless steel. However, it is to be noted that the term "wire" is not to be limited to a metal wire. Alternatively, any material having a suitable elasticity may be used for the wires 30A, 30B, 30C, 30D, 30E, 30F. For example, the wires of the wire basket 30 may be formed of a plastic material having the appropriate characteristics for the wire basket 30 of the present invention. The material of the wires 30A, 30B, 30C, 30D, 30E, 30F should be elastic such that an initially straight wire 30A, 30B, 30C, 30D, 30E, 30F may be bent into the desired shape. At the same time, the material must be rigid enough to hold its shape when the wire basket 30 is used to mix or beat food.

Alternatively, the wires 30A, 30B, 30C, 30D, 30E, 30F do not need to be initially straight, but may instead be formed in the desired shape initially. Such wires 30A, 30B, 30C, 30D, 30E, 30F need not have the elasticity described above, but should have the rigidity to maintain the shape.

In an embodiment, the wire basket 30 has six wires 30A, 30B, 30C, 30D, 30E, 30F and the specific placement of the wires 30A, 30B, 30C, 30D, 30E, 30F is shown in FIGS. 7, 8B, and 9. For example, the ends of the first wire 30A are threaded through holes 42A. The ends of the second wire 30B are threaded through holes 42B. The remaining four wires 30C, 30D, 30E, 30F are threaded through holes 42C, 42D, 42E, 42F, respectively. In one embodiment, two of the holes 42 of the wire holder 40 remain without wires 30, as shown in FIGS. 7 and 8B. Alternatively, there may be a different number of wires 30A, 30B, 30C, 30D, 30E, 30F and the specific placement of the wires 30A, 30B, 30C, 30D, 30E, 30F may be different as well.

As shown in FIGS. 2B and 7, the wires 30A, 30B, 30C, 30D, 30E, 30F are crimped both above and below the wire holder 40 after being threaded through the holes 42 to keep the wire basket 30 coupled to the wire holder 40. Although the wire basket 30 is kept in place with respect to the wire holder 40, each wire 30A, 30B, 30C, 30D, 30E, 30F of the wire basket 30 remains free to twist about its axis. The diameter of each wire 30A, 30B, 30C, 30D, 30E, 30F is small enough that each wire 30A, 30B, 30C, 30D, 30E, 30F may be threaded through a hole 42 on the wire holder 40, but the diameter of each wire 30A, 30B, 30C, 30D, 30E, 30F is large enough such that there is enough friction between the wire 30A, 30B, 30C, 30D, 30E, 30F and the hole 42 to hold the wire 30A, 30B, 30C, 30D, 30E, 30F in the position to which it is manually twisted.

The wire basket 30 may be twisted to expand and collapse the whisk. FIGS. 1–2B show the wire basket 30 of the whisk in a collapsed state. The wires 30A, 30B, 30C, 30D, 30E, 30F are all oriented generally in the same direction when the whisk is in the flattened state, as shown in FIGS. 1–3. The wire basket 30 of the whisk may be opened or expanded by twisting the wires 30A, 30B, 30C, 30D, 30E, 30F in a circular fashion and pushing the wire basket 30 down toward the handle 20, as shown by arrows 60 and 70 in FIG. 5. FIG. 4 is an end view from the top of the wire basket 30 when the wire basket 30 is in an expanded state. In the expanded state, the wire basket 30 has a star-like shape, when viewed from the top, as shown in FIG. 3. The whisk may be flattened or collapsed by twisting the wire basket 30 in the opposite direction and pulling the wire basket 30 away from the handle 20.

Although the wire basket 30 may be twisted while the wire holder 40 remains stationary, another method of collapsing the wire basket 30 is to push the wire basket 30 toward the handle 20, as shown by arrow 70, or to pull the wire basket 30 away from the handle 20 while twisting the wire basket 30. The wire holder 40 also twists within the handle 20 when the wire basket 30 is either pushed toward the handle 20 or pulled away from the handle 20. The twisting of the wire holder 40 aids in the collapse or expansion of the wire basket 30.

Due to the "balloon" or "tear-drop" shape of the wire basket 30 and the circumferential positioning of the wires 30A, 30B, 30C, 30D, 30E, 30F through the wire holder 40, the wire basket 30 will fan out or expand when the wire basket 30 is pushed down toward the handle 20 in the direction of arrow 70. The wire basket 30 tends to remain flattened in the collapsed position when the wire basket 30 is pulled away from the handle 20 in the opposite direction of arrow 70 and, at the same time, twisted such that holes 42A, 42B, 42C, 42D, 42E, 42F of the wire holder 40 line up with the arcuate apertures 24. That is, the holes 42G without a corresponding wire 30 are lined up such that they would not be seen through the arcuate apertures 24.

Although the present invention has been described in connection with particular embodiments and terms, the invention, as claimed, should not be limited to such embodiments and terms. It is to be understood that, although one embodiment of the present invention has been described in some detail, various changes may be made by those skilled in the art without departing from the spirit and scope of the invention as defined by the appended claims.

What is claimed is:

1. A collapsible whisk, comprising:
    a handle; and
    a wire basket comprising a plurality of wires that may be freely moved between an expanded position and a substantially flattened position without deformation of said wires.

2. The collapsible whisk of claim 1, wherein all of the wires are oriented in a substantially same direction when the wire basket is in the flattened position.

3. The collapsible whisk of claim 1, further comprising a wire holder inserted in the handle, the wire holder having an end with a plurality of holes.

4. The collapsible whisk of claim 3, wherein each of the plurality of wires has two ends, each of the ends being threaded through one of the plurality of holes.

5. A collapsible whisk, comprising:
    a handle; and
    a wire basket comprising a plurality of wires that may be moved between an expanded position and a flattened position, wherein the handle has a proximal end on which there is an arcuate aperture through which the wires are inserted to provide free movement of the wires between an expanded and generally flattened position.

6. A collapsible whisk, comprising:
    a hollow handle;
    a hollow wire holder slidably inserted within the handle; and
    a plurality of wires, wherein each wire has two ends threaded through the wire holder and wherein the ends are free to be between an expanded and a substantially flattened orientation twisted.

7. The collapsible whisk of claim 6, wherein the handle has a proximal end having two arcuate apertures through which the wires are inserted.

8. The collapsible whisk of claim 6, wherein the wire holder has a plurality of holes through which the wires are threaded.

9. The collapsible whisk of claim 8, wherein the plurality of holes is circumferentially positioned.

10. The collapsible whisk of claim 6, wherein the wire holder is slidably mounted within the handle.

11. The collapsible whisk of claim 10, wherein the wire holder may be twisted within the handle.

12. A collapsible whisk, comprising:
    a hollow handle;
    a hollow wire holder slidably inserted within the handle; and
    a plurality of wires, wherein each wire has two ends threaded through the wire holder and wherein the ends are free to be twisted, and
    wherein the handle has a proximal end having two arcuate apertures through which the wires are inserted, and
    wherein the wire holder has a plurality of circumferentially positioned holes through which the wires are threaded, and
    wherein the plurality of holes is on each end of the wire holder and each wire is crimped above and below the wire holder.

13. A collapsible whisk, comprising:
    a hollow handle having a proximal end with two arcuate apertures;
    a hollow wire holder inserted within the handle, the wire holder having and end with a plurality of holes; and
    a plurality of wires, wherein each wire has two ends with each end being threaded through one of the plurality of holes of the wire holder whereby said wires are capable of movement between an expanded and a substantially flattened position without deformation of said wires.

14. The collapsible whisk of claim 13, wherein the wire holder is slidably mounted within the handle.

15. The collapsible whisk of claim 14, wherein the wire holder may be twisted within the handle.

16. The collapsible whisk of claim 13, wherein the plurality of holes is circumferentially positioned.

17. The collapsible whisk of claim 13, wherein the plurality of holes is on each end of the wire holder and each wire is crimped above and below the wire holder.

18. The collapsible whisk of claim 13, wherein the plurality of holes is circumferentially positioned.

19. A collapsible whisk, comprising;
    a hollow cylindrical handle having a proximal end on which two arcuate apertures are positioned;
    a cylindrical wire holder having an end, the wire holder being inserted into the handle and the end having a plurality of holes circumferentially positioned;
    a plurality of wires inserted into the handle through the arcuate apertures, each of the plurality of wires having two ends, wherein each end is threaded through one of the plurality of holes.

20. The collapsible whisk of claim 19, wherein the wire holder is slidably mounted within die handle.

21. The collapsible whisk of claim 19, wherein the wire holder may be twisted within the handle.

22. A method for flattening a collapsible whisk comprising the steps of:
    providing a whisk in an expanded position, comprising a handle a plurality of wires coupled to the handle, the wires being capable of being freely moved between the expanded position and a generally flattened position; and
    moving the wires to the flattened position such that the wires are all substantially in a same direction.

23. The method of claim 22, further comprising the step of pulling the wires in a direction away from the handle while moving the wires.

24. The method of claim 22, wherein the whisk further comprises a wire holder inserted within the handle, the wire holder having a plurality of holes on an end of the wire holder and wherein each of the plurality of wires is threaded through one of the plurality of holes.

25. A method for flattening a collapsible whisk, comprising:

providing a whisk in an expanded position, the whisk including a handle and a plurality of wires coupled to the handle, the wires being capable of being freely moved between the expanded position and a flattened position; and moving the wires to the flattened position such that the wires are all substantially in the same direction without deformation of said wires, and wherein the handle has a proximal end with an arcuate aperture through which the wires are inserted.

26. A method of expanding a flattened whisk, comprising the steps of:

providing a whisk in a flattened position, comprising a handle and a plurality of wires coupled to the handle, the wires being capable of being freely moved between an expanded position and the flattened position; and moving the wires to the expanded position without deforming said wires, such that the wires are all in substantially different directions.

27. The method of claim 26, further comprising the step of pushing the wires in a direction toward the handle while moving the wires.

28. The method of claim 26, wherein the whisk further comprises a wire holder inserted within the handle, the wire holder having a plurality of holes on an end of the wire holder and wherein each of the plurality of wires is threaded through one of the plurality of holes.

29. A method of expanding a flattened whisk, comprising:

providing a whisk in a flattened position, the whisk including a handle and a plurality of wires coupled to the handle, the wires being capable of being freely moved between an expanded position and the flattened position; and moving the wires to the expanded position such that the wires are all in substantially different directions without deforming said wires, and wherein the handle has a proximal end with an arcuate aperture through which the wire is inserted.

\* \* \* \* \*

UNITED STATES PATENT AND TRADEMARK OFFICE
CERTIFICATE OF CORRECTION

PATENT NO. : 6,206,561 B1
DATED : March 27, 2001
INVENTOR(S) : Hefti

Page 1 of 1

It is certified that error appears in the above-identified patent and that said Letters Patent is hereby corrected as shown below:

Column 5,
Line 49, insert "twisted" between "be" and "expanded"
Line 50, remove "twisted"

Signed and Sealed this

Twenty-fifth Day of September, 2001

Attest:

Nicholas P. Godici

NICHOLAS P. GODICI
Attesting Officer
Acting Director of the United States Patent and Trademark Office